United States Patent [19]

Stevens

[11] Patent Number: 4,589,614

[45] Date of Patent: May 20, 1986

[54] AERIAL BURNING AND FIRE CONTROL UNIT FOR A HELICOPTER

[75] Inventor: Grady E. Stevens, Natchitoches, La.

[73] Assignee: International Paper Company, New York, N.Y.

[21] Appl. No.: 613,486

[22] Filed: May 24, 1984

[51] Int. Cl.[4] .............................................. B64D 1/18
[52] U.S. Cl. .................................... 244/136; 239/171; 169/53
[58] Field of Search ....................... 244/136; 239/171; 169/53

[56] References Cited

U.S. PATENT DOCUMENTS

| 3,428,276 | 2/1969 | Hubbard . | |
| 3,494,423 | 2/1970 | Stansbury . | |
| 3,710,868 | 1/1973 | Chadwick | 239/171 |
| 3,714,987 | 2/1973 | Mattson | 169/53 |
| 3,849,921 | 11/1974 | Nelson | 244/136 |
| 3,897,829 | 8/1975 | Eason . | |
| 3,936,018 | 2/1976 | Barlow . | |
| 4,090,567 | 5/1978 | Tomlinson | 244/136 |

FOREIGN PATENT DOCUMENTS 481396 2/1952 Canada ............................... 244/136

Primary Examiner—Galen L. Barefoot
Attorney, Agent, or Firm—Walt Thomas Zielinski; Royal E. Bright

[57] ABSTRACT

This invention relates to an aerial burning and fire control unit which is to be carried by a helicopter, but is separate and independent of the helicopter so that the helicopter is in no way encumbered by the unit. When carried by the helicopter, the unit is received within the landing gear of the helicopter so that the helicopter may land while carrying the unit. On the other hand, the unit may be immediately jettisoned, when necessary by releasing the cargo hook. The unit has the dual function both as an aerial torch for controlled burning and as a water dump, the tank assembly of the unit being suitable for both supplying fuel to the burners and carrying water for dump purposes.

9 Claims, 4 Drawing Figures

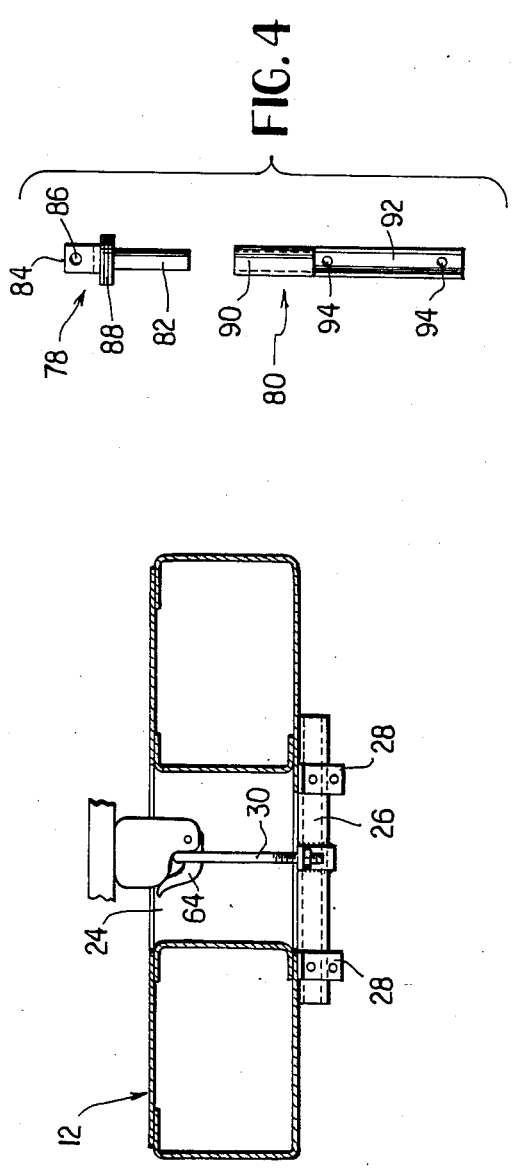
FIG. 4
FIG. 2
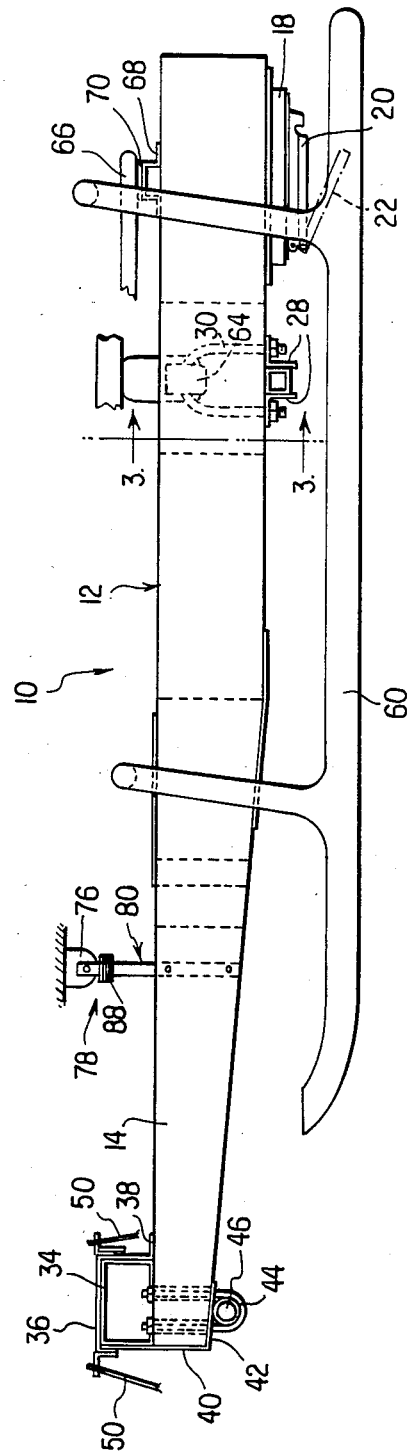
FIG. 3

AERIAL BURNING AND FIRE CONTROL UNIT FOR A HELICOPTER

This invention relates in general to new and useful improvements in fire fighting equipment to be carried by a helicopter, and more particularly to an aerial burning and fire control unit which may be fixedly carried by a helicopter, yet instantaneously releasably therefrom.

Prior to this invention self-contained burning units have been suspended below the helicopter by way of a cargo hook. Such a device is disclosed in U.S. Pat. No. 3,428,276 to A. W. Hubbard, of Feb. 18, 1969. Aerial burning units of this type are suspended from the cargo hook 20 to 30 feet below the aircraft. Flying speed and maneuverability are severely limited. The pilot must have excellent depth perception and use extreme care to prevent collision with tree tops and to protect the ground crew during refueling. Each time the torch is released for refueling, the aircraft must hover directly over the ground crew in order to attach the cable and controlwise.

It is also known to suspend large water buckets from which water is dumped onto a fire. These are alternatively attached to the cargo hook.

Aerial units for spraying non-flamable materials are also fixedly carried by helicopters. Such units are disclosed in the U.S. Pat. Nos. to Stansbury 3,494,423, of Feb. 10, 1970; Mattson 3,714,987, of Feb. 6, 1973, Eason 3,897,829, of Aug. 5, 1975; and Barlow 3,936,018, of Feb. 3, 1976. With the exception of the Barlow system, these systems all have the deficiency in that they cannot be jettisoned in the event of difficulties. Further, they greatly reduce the availability of the helicopter for other uses.

In accordance with this invention there is provided an aerial burning and fire control unit for a helicopter which, although it is suspended from the cargo hook so that it may be readily jettisoned, is maintained in fixed relation with respect to the helicopter by means of locators fore and aft on the unit.

Another feature of the aerial burning and fire control unit of this invention is the fact that it is fully seated within the confines of the landing gear so that the helicopter may land for attaching and releasing the unit as well as for refueling.

Yet another feature of the invention is that the tank of the unit may be used for a water dump and is provided with at least one sump having associated therewith a dump door. Thus, the unit has the dual capacity of use as a torch or for fire control.

IN THE DRAWINGS

FIG. 2 is a side elevational view of the unit showing further details and the relationship of the support and positioning components with respect to portions of a helicopter.

FIG. 3 is an enlarged fragmentary transverse sectional view taken through the tank assembly of the unit and shows the specific manner in which the unit is suspended from the customary cargo hook.

FIG. 4 is an exploded elevational view showing the details of a locator pin and an associated socket wherein a forward part of the device is fixedly positioned relative to a helicopter.

Figure 1:
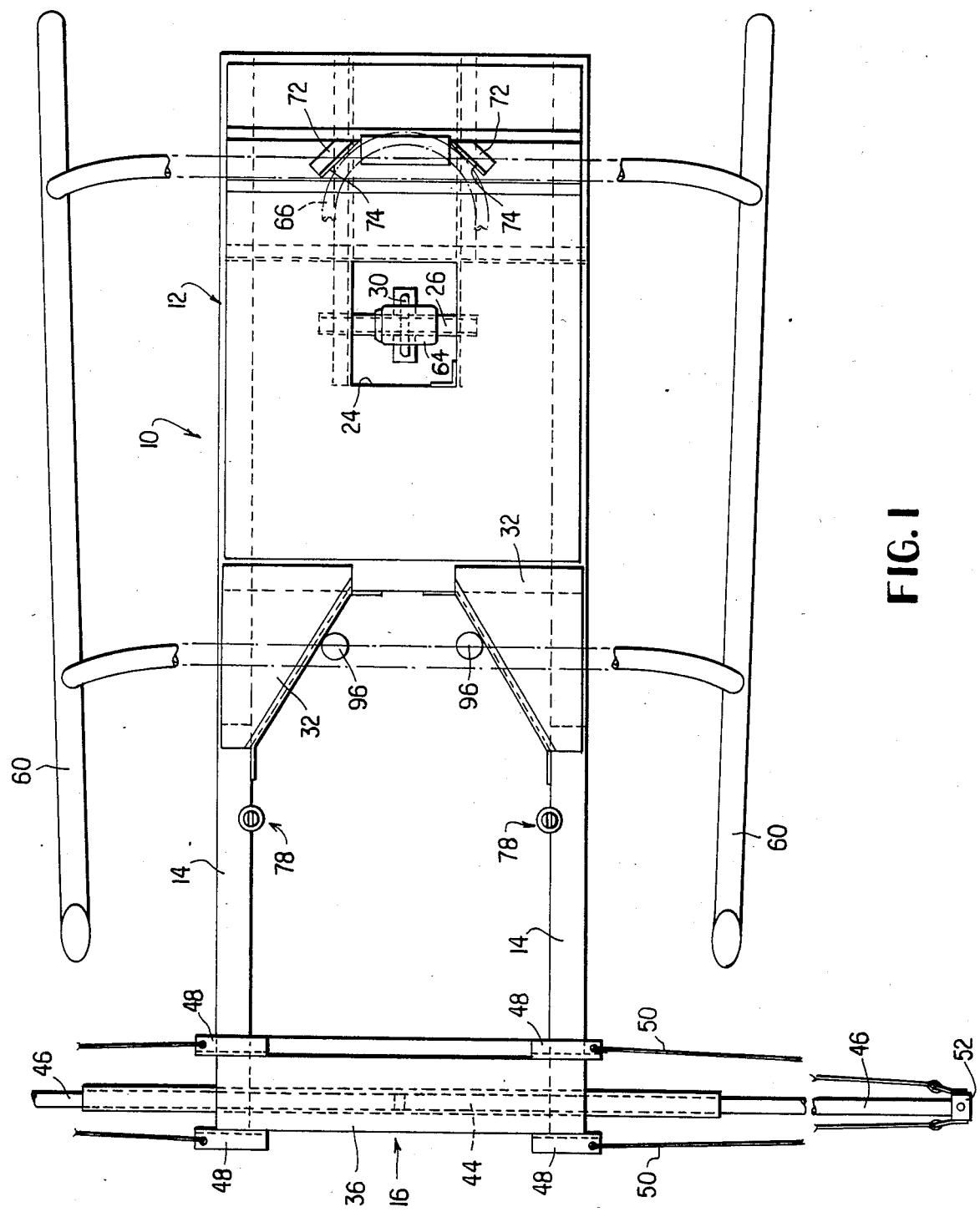
FIG. 1 is a plan view of the aerial burning and fire control unit showing the relationship with respect to the landing gear of a helicopter, a cargo hook thereof and an associated frame member.

Referring now to the drawings the aerial burning and fire control unit is generally identified by the numeral 10. The unit 10 includes a rear tank assembly, generally identified by the numeral 12, a pair of rails 14 extending forwardly from the front portion of the tank assembly 12, and a forward boom assembly, generally identified by the numeral 16.

The tank assembly 12 is generally rectangular in plan and is of a rigid construction. It is provided with the usual baffles to prevent both sideward and fore and aft flow with the baffles being arranged so that the load of the liquid within the tank is in a balanced fore and aft position at all times. Thus, the sudden discharge of the contents of the tank assembly 12 does not disturb the equilibrium of the helicopter.

As is best shown in FIG. 2, the rear underside of the tank assembly 12 is provided with two, side-by-side sumps 18. Each sump 18 is provided with a discharge opening 20 normally closed by a dump door 22 which is illustrated in a partly open position in FIG. 2.

Suitable filing means (not shown) are provided on the tank assembly 12.

It is to be noted that generally centrally of the tank assembly 12 there is a through opening or well 24. Extending across the underside of the tank assembly 12 in alignment with the well 24, as is best shown in FIG. 3 is a support bar 26. The support bar 26 is secured to the underside of the tank assembly 12 by means of angle brackets 28 (FIG. 2).

The support bar 26 has an upwardly projecting, centrally located U-bolt 30. The U-bolt 30, as is clearly shown in FIGS. 2 and 3, extend into the well 24.

The side rails 14 are reinforced relative to the forward part of the tank assembly 12 by gusset plates 32. At the forward ends thereof, the side rails 14 are connected together by a transverse frame member 34 of a generally box configuration which, in turn, is reinforced by a further frame member 36 which extends up and around the frame member 34 and has a rear mounting flange 38 which is secured to the top of the side rail 14. The frame member 36 also includes a front panel 40 and terminates in a bottom panel 42 which underlies and is secured to the forward position of the frame rail 14.

The boom assembly includes a central boom member 44 which is clamped against the undersides of the forward portions of the side rails 14 by means of U-shaped clamp members 46, as is best shown in FIG. 2. The boom member 44 (FIG. 1) has extending therefrom boom elements 46 which project to opposite sides of the unit 10.

At opposite corners thereof, the frame member 36 carries angle members 48. The angle members 48 each have extending outwardly therefrom a pair of guy wires 50 which are secured to brackets 52 at the opposite ends of the booms 46 and to intermediate portions of the booms 46, not shown. The booms 46 are thus stabilized in their widely extending positions.

It is to be understood that the unit 10 is to be suspended immediately below the fuselage of a helicopter within the general confines of the landing gear 60 thereof. The unit 10 is supported by the usual cargo hook 64 which depends from the helicopter fuselage and engages the U-bolt 30, as is clearly shown in FIG. 3.

There are also positioning means between the helicopter fuselage and the unit 10. Rearwardly of the cargo hook cable 62 is a generally semicircular frame member 66 which is best shown in dotted lines in FIG. 1. The rear part of the tank assembly 12 has extending across the top part thereof a bearing pad 68. A wear plate 70 overlies the bearing pad 68 and is clamped against the underside of the frame member 66 by the upward thrust of the cargo hook 64.

The rear part of the tank assembly 12 is positioned against transverse movement by a pair of angle members 72 (FIG. 1) having converging vertical flanges 74 which bear against the rear portions of the semicircular frame member 66.

It will be apparent that the rear part of the tank assembly 12 is held against the frame member 66 against both further vertical movement and against both side and forward movement.

The customary helicopter fuselage is also provided with jacking pads 76 on the forward bottom part thereof. In accordance with this invention, there is secured to each of the jacking pads 76 a locating pin 78 which is received in an upper part of a socket 80.

As is best shown in FIG. 4, the locating pin 78 includes a reduced diameter lower portion 82 and an enlarged upper portion 84 which is longitudinally bifurcated and which has extending therethrough a bore 86 for receiving and attaching to the end of the bolt. The reduced diameter lower portion 82 has engaged on the upper part thereof a plurality of resilient washers 88.

The socket 80 is in the form of a length of tubing having a complete circular cross-section upper part 90 of a size to snuggly receive the reduced diameter lower portion 82 of the locator pin 78. A lower portion 92 of the socket 80 is cut away to define a flat surface which will abut against a respective one of the side rail 14 and may be suitable bolted thereto through openings 94 20 formed in the lower portion 92.

It is to be understood that with the units 10 resting on the ground a helicopter equipped to receive the unit may land in straddling relation thereto, after which the cargo hook 60 is engaged with the U-bolt 30 and the unit 10 secured in place. The unit is positioned so that the locator pins 78 enter into the sockets 80 and the rear part of the frame member 66 enters between the guide flanges 74. It is to be understood that the wear pads 70 and the washers 88 are of such a thickness that when the unit 10 is pulled up tightly through adjustment of the U-bolts 30, both the washers 88 and the wear pads 70 will be resiliently compressed.

Returning again to FIG. 1, it will be seen that there is mounted rearwardly of the tank assembly 10 a pair of fuel pumps 96. Each of the fuel pumps 96 is connected by means of suitable hoses (not shown) to a respective one of the booms 46 for delivering fuel thereto. The fuel pumps 96 are also suitably connected to the tank assembly 12 for receiving fuel from the tank assembly. In this manner the unit 10 may be utilized as an aerial burning unit or torch so as to set back fires and the like.

On the other hand, the tank assembly 12 may function as a water bucket. Instead of placing fuel within the tank assembly 12, water may be loaded into the tank assembly 12. Then when the helicopter is flown over a fire, the dump doors 22 may be opened so as to dump the water out of the tank. As previously explained, the tank assembly 12 is provided with suitable baffles (not shown) to provide for uniform flow of water and fuel out of the tank assembly. Further, the tank assembly capacity is so balanced with respect to the eye 30 that even when there is an immediate dumping of the entire contents of the tank assembly, there is no change in the fore and aft center of gravity of the unit 10 which would disturb the balance of the helicopter.

It will be readily apparent that in use the device 10 becomes a rigid part of the helicopter, but can be jettisoned without any preparation by cutting the cable 62. It will also be apparent that when the unit 10 is not being utilized, the helicopter will not be encumbered by any unnecessary attachments. The locator pins 78 may be quickly removed and no other part of the helicopter is particularly adapted for receiving the unit 10.

Although only a preferred embodiment of the aerial burning and fire control unit has been specifically illustrated and described herein, it is to be understood that minor variations may be made in the unit without departing from the spirit and scope of the invention as defined by the appended claims.

I claim:

1. An aerial burning and fire control unit for a helicopter of the type including a fuselage and a landing strut, said unit comprising a rear tank assembly, a pair of forward side rails projecting forwardly from said tank assembly, and a forward spray boom arrangement supported directly by said forward side rails, and positioning means and supporting means on said tank assembly and said forward side rail arrangement for fixedly and releasably supporting said unit beneath a helicopter fuselage and in an out of the way position within the general confines of a helicopter landing strut.

2. An aerial burning and fire control unit according to claim 1 wherein said positioning means for fixedly supporting said unit includes a bearing pad for engaging the underside of a helicopter frame member having remote side surfaces, and converging guide and positioning elements fixed relative to said bearing pad and engagable with the remote side surfaces of said frame member.

3. An aerial burning and fire control unit according to claim 1 wherein said positioning means for said unit includes a vertical locator pin and socket arrangement each in part associated with each of said side rails and in part attachable to a jack point fitting on a helicopter.

4. An aerial burning and fire control unit according to claim 1 wherein said positioning means for said unit includes a bearing pad for engaging the underside of a frame member, and converging guide and positioning elements fixed relative to said bearing pad and engagable with remote side surfaces of said frame member, said positioning means for said unit also including a vertical locator pin and socket arrangement each in part associated with each of said side rails and in part attachable to a jack point fitting on a helicopter.

5. An aerial burning and fire control unit according to claim 4 together with compressible washers between each locator pin and its respective socket.

6. An aerial burning and fire control unit according to claim 1, wherein said tank has a bottom sump, and there is a dump door associated with said sump whereby said tank may also carry water for a water dump.

7. An aerial burning and fire control unit according to claim 2 wherein said bearing pad and said converging guide and positioning elements are carried by said tank assembly remote from said side rails.

8. An aerial burning and fire control unit according to claim 1 together with said forward spray boom assembly extending transversely of and between and beyond forward positions of said side rails.

9. An aerial burning and fire control unit according to claim 8 wherein said side rails are of a length to position said spray boom assembly forward of an associated helicopter landing strut.

* * * * *